United States Patent [19]

Marsh et al.

[11] Patent Number: 5,103,213
[45] Date of Patent: Apr. 7, 1992

[54] SHAFT ROTATION MONITORING APPARATUS

[75] Inventors: Norman F. Marsh, Port Huron; Scott M. Hewelt, Marine City, both of Mich.

[73] Assignee: Bindicator Company, Port Huron, Mich.

[21] Appl. No.: 543,041

[22] Filed: Jun. 25, 1990

[51] Int. Cl.$^5$ .......................................... G08B 21/00
[52] U.S. Cl. .................................. 340/671; 361/51; 324/160; 324/166; 324/175
[58] Field of Search ................ 340/671; 324/166, 175, 324/160; 361/51

[56] References Cited

U.S. PATENT DOCUMENTS

| | | | |
|---|---|---|---|
| 3,264,496 | 8/1966 | Scholl | 324/166 |
| 3,636,545 | 1/1972 | Boyd et al. | 361/51 |
| 3,739,367 | 6/1973 | Fathauer | 340/671 |
| 3,792,460 | 2/1974 | Ratz | 340/671 |
| 3,932,812 | 1/1976 | Milligan | 324/161 |
| 4,090,181 | 5/1978 | Ansari et al. | 340/671 |
| 4,195,291 | 3/1980 | Burks, Jr. | 340/671 |
| 4,521,894 | 6/1985 | Moffat | 377/16 |
| 4,794,551 | 12/1988 | Yoshida | 324/166 |
| 5,031,144 | 7/1991 | Persky | 361/321 |

Primary Examiner—Glen R. Swann, III
Attorney, Agent, or Firm—Barnes, Kisselle, Raisch, Choate, Whittemore & Hulbert

[57] ABSTRACT

A photo-optical coupler is connected to a shaft to provide a series of electronic pulses at a frequency corresponding to rotational velocity of the shaft. Apparatus electronics is responsive to frequency of such pulses for indicating a low speed alarm condition when such frequency is below a preselected threshold. The apparatus electronics includes a digital counter that is set to a first preselected count upon occurrence of each of the shaft rotation pulses, and which is thereafter decremented between the shaft rotation pulses. A low speed alarm condition is indicated if the counter reaches a count of zero prior to a succeeding shaft rotation pulse. In the preferred embodiment, the counter is decremented by an oscillator having a clock frequency coordinated with the first preselected count so as to activate the alarm when rotational velocity of the shaft decreases to a predetermined threshold percentage of a nominal rotational velocity of the shaft.

14 Claims, 3 Drawing Sheets

SHAFT ROTATION MONITORING APPARATUS

The present invention is directed to apparatus for monitoring rotational velocity of a shaft.

OBJECTS AND SUMMARY OF THE INVENTION

It is a general object of the present invention to provide apparatus for monitoring rotational velocity of a shaft and indicating an alarm condition when such rotational velocity decreases or drops below a predetermined threshold value, or increases above a predetermined threshold value—i.e., either an absolute value of rotational velocity or a percentage of nominal rotational velocity. Another object of the present invention is to provide apparatus of the described character that is adapted to monitor rotational velocity over a wide velocity range. A further object of the invention is to provide apparatus of the described character in which the low-speed and/or high-speed threshold is readily reprogrammable in the field by relatively unskilled personnel. Yet another object of the present invention is to provide apparatus of the described character that obtains one or more of the foregoing objectives in a package that embodies state-of-the-art electronics, is relatively inexpensive to manufacture, and exhibits reliable and efficient operation over an extended operating lifetime.

The foregoing and other objects are obtained in accordance with the present invention in apparatus that includes a coupler, such as a photo-optical coupler, connected to the shaft to provide a series of electronic pulses at a frequency corresponding to rotational velocity of the shaft. Apparatus electronics is responsive to the frequency of such pulses for indicating a low or high speed alarm condition when such frequency is below or above a preselected threshold. In accordance with one aspect of the invention, the apparatus electronics includes a digital counter that is set to a first preselected count upon occurrence of each of the shaft rotation pulses, and which is thereafter clocked between the shaft rotation pulses toward a second preselected count. A speed alarm condition is indicated if the counter reaches the second preselected count prior to a succeeding shaft rotation pulse. In the preferred embodiment that incorporates this aspect of the invention, the counter is clocked by an oscillator having a clock frequency coordinated with the first and second preselected counts so as to activate the alarm when rotational velocity of the shaft decreases to a predetermined percentage of a nominal rotational velocity of the shaft.

Most preferably, in accordance with this first aspect of the invention, the counter takes the form of a down-counter having data inputs coupled to programming switches for presetting the counter. In a calibration mode of operation, the shaft is operated at nominal rotational velocity, and the switches are set to states corresponding to a preselected percentage of such nominal velocity equal to the desired low-speed detection threshold. Where the counter takes the form a down-counting decade counter, the switches may comprise decade switches that may be directly set by the operator to a numeric value corresponding to the desired low-speed threshold. With the switches set at the desired threshold value during the calibration mode of operation, and with the shaft continuing to rotate at the nominal rotational velocity, the frequency of the clock oscillator is adjusted to a point at which the detection electronics just indicates a low-speed alarm condition. Thus, the clock frequency is set in the calibration mode of operation so that the counter is originally set and thereafter decremented to zero in a time corresponding to the desired low-speed threshold percentage multiplied by the time interval between two shaft rotation pulses at the nominal rotational velocity of the shaft. Thereafter, during a normal or run mode of operation, with the clock oscillator operating at such calibrated frequency, the decade counter is set at a numeric value of substantially one hundred upon occurrence of each shaft rotation pulse, and is decremented by the clock oscillator to a count of zero only when the rotational velocity of the shaft is at or below the calibrated low-speed threshold percentage.

In accordance with a second aspect of the invention, electrical energy is stored on a capacitor in response to each of the shaft rotation pulses, and is drained from the capacitor between shaft rotation pulses at a preselected rate coordinated with frequency of the pulses so that voltage on a capacitor reaches a speed threshold at a preselected speed of shaft rotation. Electronics is coupled to the capacitor and responsive to the voltage on the capacitor to indicate a low-speed or high-speed alarm condition when the capacitor voltage is at or below such predetermined threshold. In a preferred embodiment that incorporates this second aspect of the invention, the capacitor voltage detection electronics includes a latch having one input coupled to the capacitor for setting the latch to an alarm state when voltage on the capacitor is less than the preset speed threshold, and a second input coupled to the capacitor and to the shaft rotation pulses to set the latch to a non-alarm condition upon occurrence of a shaft rotation pulse when voltage on the capacitor is above the low-speed threshold. Preferably, the rate of decay of the capacitor voltage between shaft pulses is selectively varied by means of a variable resistance connected across the capacitor. Such variable resistance may comprise either a variable resistor or multiple selectable fixed resistors of differing resistance values.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
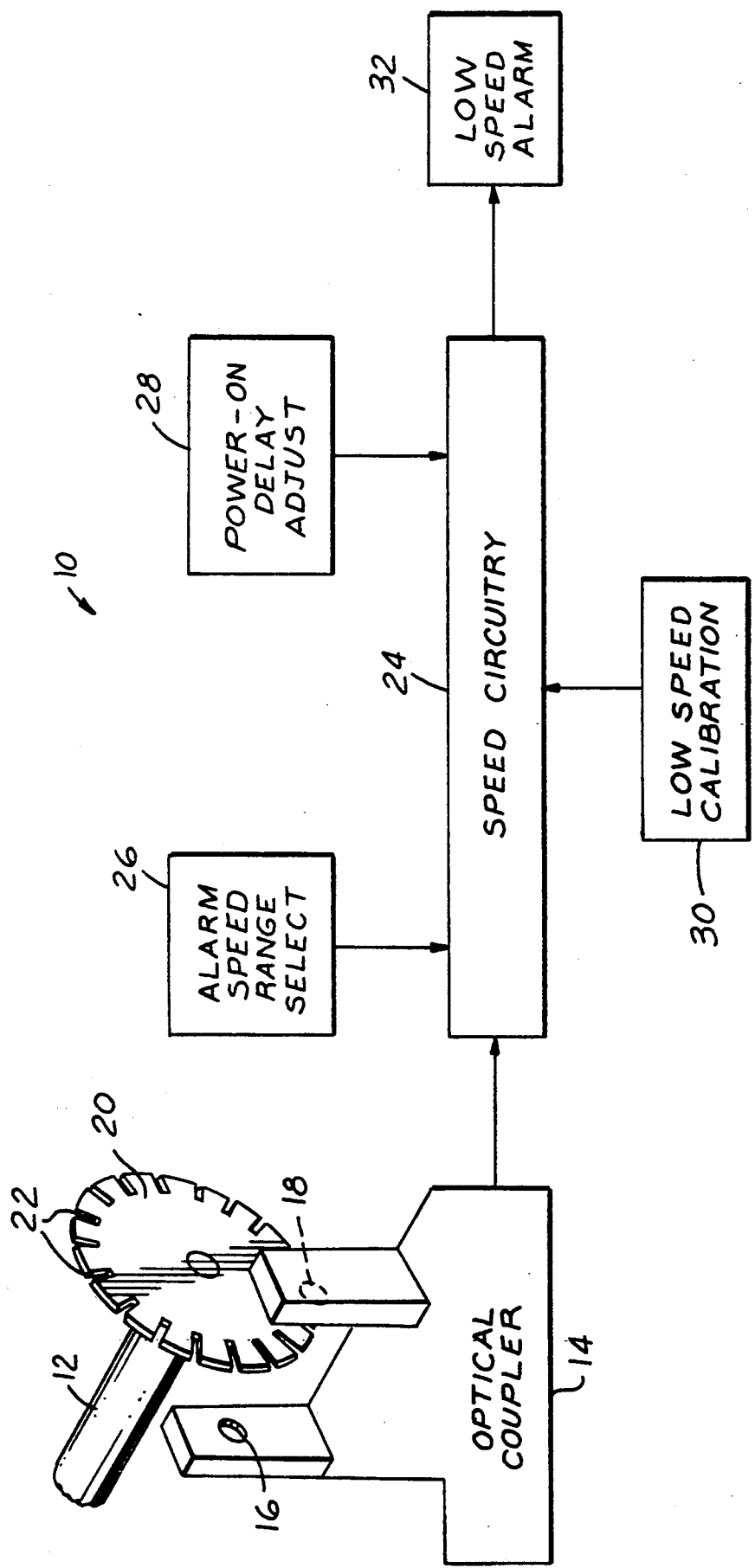
FIG. 1 is a functional block diagram of apparatus for monitoring shaft rotational velocity in accordance with a first embodiment of the invention.

FIG. 1 illustrates apparatus 10 for monitoring rotational velocity of a shaft 12 as comprising an optical coupler 14 that includes a light emitter 16 and a light detector 18 positioned adjacent to a disk 20 coupled to shaft 12. Disk 20 has a circumferential array of uniformly angularly spaced peripheral notches 22 that sequentially intercept light from emitter 16 to detector 18, so that optical coupler 14 provides a uniformly periodic series of electrical pulses to speed detection circuitry 24 at a frequency that varies as a direct function of angular velocity of disk 20 and shaft 12. Speed detection circuitry 24 receives an input 26 for selecting alarm speed range, an input 28 for adjusting delay in alarm detection upon initial application of electrical power, and an input 30 for calibrating the low-speed detection threshold. An output from speed monitoring circuitry 24 is fed to a suitable device 32 for indicating an alarm condition and taking appropriate control action, if any, upon decrease in shaft speed below the calibrated low-speed detection threshold.

Figure 2:
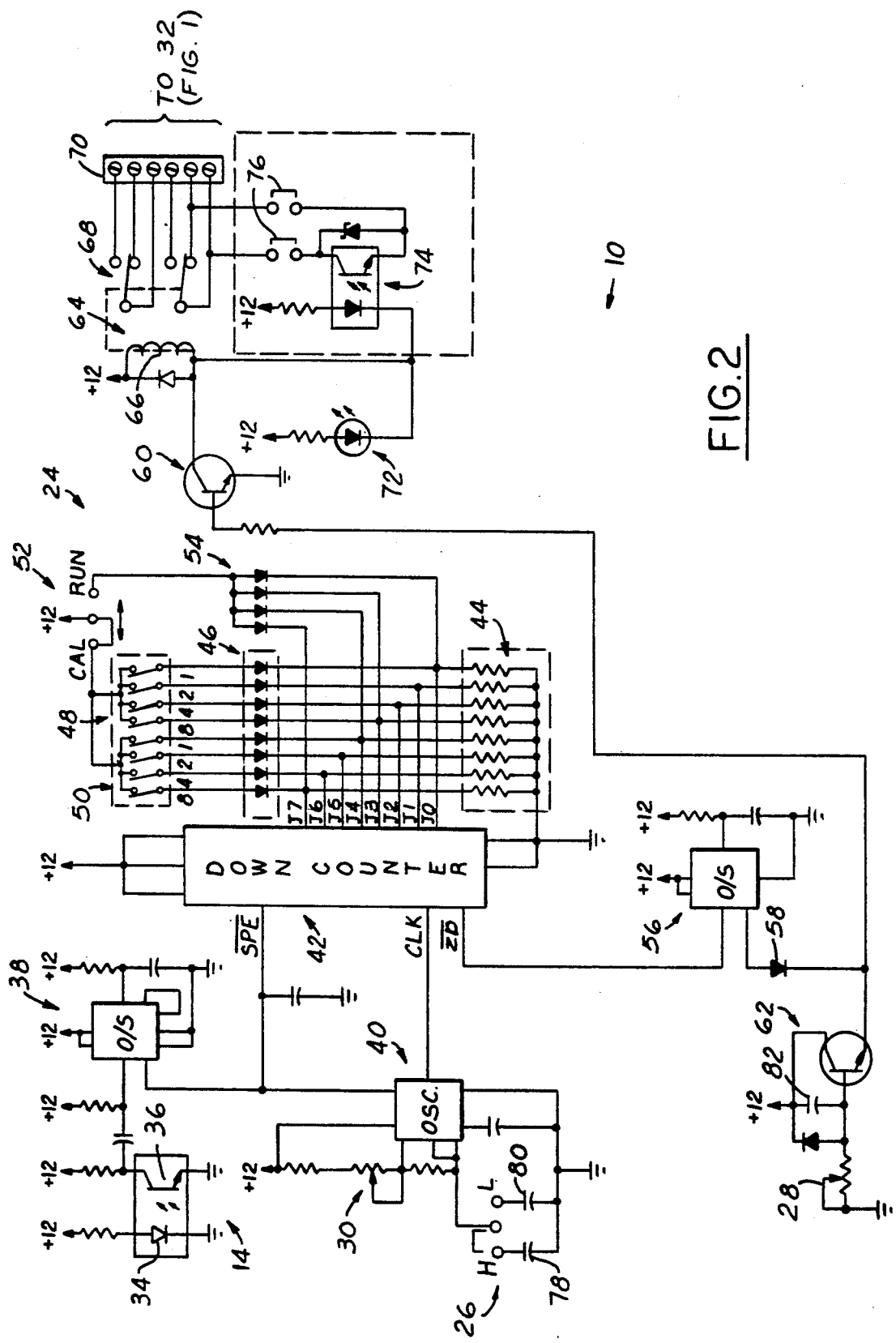
FIG. 2 is an electrical schematic diagram of the monitoring apparatus illustrated in functional block form in FIG. 1.

FIG. 2 is an electrical schematic diagram of apparatus 10. Optical coupler 14 includes an LED 34 and a phototransistor 36 connected to the input of a one-shot 38. One-shot 38 provides an output pulse of relatively short duration upon occurrence of each input pulse from coupler 14. The output of one-shot 38 is fed to the enable input of a clock oscillator 40, and to the load command input SPE of a two digit decade down-counter 42. Counter 42 has data inputs J0-J7. Each data input is connected to ground through the associated resistor of a resistor array 44, and is connected through the associated diode of an array 46 and the associated switch of two switch arrays 48, 50 to the CAL terminal of a calibrate/run slide switch 52. The RUN terminal of switch 52 is connected through four diodes 54 to the J0, J3, J4 and J7 data inputs of counter 42. Switch arrays 48,60 comprise respective decade switch arrays, with array 48 forming the "ones" digit to counter inputs J0-J3, and array 50 forming the "tens" digit to counter inputs J4-J7. The output of oscillator 40 is connected to the clock input CLK of counter 42. The frequency of oscillator 40 is controlled by low speed calibration adjustment 30, preferably a variable resistor as shown, and by alarm range adjustment 26. Range adjustment 26 preferably takes the form of a slide switch for selectively connecting resistor 30 to either of two capacitors 78,80.

The borrow or zero-detect output ZD of counter 42 is connected to the input of a one-shot 56. The output of one-shot 56 is connected through an isolation diode 58 to a relay drive transistor 60. Transistor 60 also receives a control input from a power-on delay circuit 62 that is coupled to delay adjustment 28, which preferably takes the form of a variable resistor as illustrated. An output relay 64 has a coil 66 connected to drive transistor 60, and has a pair of relay switch contact sets 68 connected through a terminal block 70 to suitable alarm indicating devices 32 (FIG. 1), such as lamps, buzzers, means for arresting or controlling rotation of shaft 12 (FIG. 1), etc. An LED 72 is connected to transistor 60 across coil 12 for indicating detection of an alarm condition at the apparatus, and is particularly useful during calibration as will be described. Transistor 60 is also connected to an optical coupler 74, which may be connected to terminal block 70 by jumpers 76 where it is desired to provide completely solid-state detection circuitry and eliminate electromagnetic relay 64.

In operation, one-shot 38 is triggered at the leading edge of each negative-going pulse from coupler 14. The pulsed output of one-shot 38 presets counter 42 through diode array 46 or 54, depending upon the setting of run/calibrate switch 52 as will be described. Clock oscillator 48 is disenabled at this time. After one-shot 38 times out and clock oscillator 40 is enabled, oscillator 40 clocks counter 42 at a frequency determined by variable resistor 26 and selected capacitor 78 or 80. Each clock pulse from oscillator 40 decrements counter 42 from the initial preset count. If the next pulse is received from coupler 14 before counter 42 decrements to zero, the counter is reloaded by one-shot 38, and the process is repeated. However, if counter 42 reaches a count of zero before the next coupler output pulse, one-shot 56 is triggered by counter output ZD. The output of one-shot 56 is normally high, so that transistor 60 is normally turned on and energizes output relay 64 and LED 72. Upon occurrence of a zero count in counter 42, the output of one-shot 56 goes low, transistor 60 is turned off, and relay 64 and LED 72 are deenergized so as to indicate an alarm condition through relay switch 68 and terminal block 70. Preferably, the pulse duration of one-shot 56 is sufficiently long, as on the order of 1.5 seconds, to prevent relay chatter in the event of low shaft rotational velocity Upon initial application of electrical power to apparatus 10, delay 62 turns on transistor 60 independently of one-shot 56 for a time determined by variable resistor 28 in combination with the capacitor 82. This delay time, which may be as long as one minute, is adjusted to a level sufficient to permit the shaft to reach operating speed, upon initial application of power, without triggering an alarm condition.

Speed monitoring circuitry 24 is calibrated by positioning the slider of switch 52 in the CAL position as shown in FIG. 2, setting the decade switches 48,50 to a numerical value corresponding to the desired low-speed detection threshold as a percentage of nominal shaft velocity, and adjusting the frequency of oscillator 40 so as to indicate an alarm condition at LED 72. More specifically, calibration is performed by first setting the speed of shaft 72 at the desired nominal angular velocity, for example 400 rpm. Slide switch 26 is then set as a function of the desired alarm detection threshold. For example, if a low-speed alarm is to be detected in the speed range of 20 to 400 rpm, switch 26 is set in the H or high alarm speed position as shown. If desired low speed detection threshold is within the range of 2 to 40 rpm, for example, switch 26 is set in the low or L position. For purposes of explanation, it is assumed that the low-speed detection threshold is to be set at 75% of the nominal rotational velocity, so switch 26 is set to the H position as shown in FIG. 2.

As a next step in the calibration procedure, decade switch arrays 48,50 are set at a numeric value corresponding to the desired low-speed detection percentage threshold, in this example 75%. Thus, "tens" switch array 50 is set at the "7" position so as to provide a high voltage level at the "1," "2" and "4" output lines and a low voltage level on the "8" output line. That is, the switches illustrated schematically in FIG. 2 associated with the "1," "2" and "4" output lines are closed, so as to connect supply voltage through the associated diodes in array 46 to the J4-J6 data inputs of counter 42, while the switch associated with the "8" output line is open and counter data input J7 is therefore low. In the same way, "ones" switch array 48 is set to the "5" position, so that the "1" and "4" output lines to counter inputs J0 and J2 are high, while the "2" and "8" output lines of switch array 48 to counter inputs J1 and J3 are low. With the shaft rotating at its nominal angular velocity, the frequency of oscillator 40 is then adjusted by means of resistor 30 until an alarm condition is just indicated—i.e., marginally indicated —at LED 72. That is, the frequency of oscillator 40 is gradually increased, through adjustment of resistor 50, until counter 42 just reaches a count of zero between successive input pulses from coupler 14. Thus, since switch arrays 48,50 are set at the desired low-speed detection threshold percentage, "75" in this example, and since decade counter 42 is set at this threshold percentage at the leading edge of each input pulse, the frequency of clock oscillator 40 is set during the calibration mode of operation so that the counter times out or reaches a zero count at the percentage of shaft nominal angular velocity set at switches 48,50.

Thereafter, following completion of the calibration mode of operation, slide switch 52 is placed in the RUN position. Diode array 54 places a high voltage or logical one at the J0, J3, J4 and J7 data inputs to counter 42, corresponding to a decade count of "99," or substantially one hundred. Thus, at the leading edge of each input pulse from coupler 14, one-shot 38 functions to preload or preset counter 42 to a count of "99." Counter 42 is thereafter decremented by oscillator 40 until the next input pulse is received. If the time interval between input pulses is sufficiently long, oscillator 40 decrements counter 42 to zero, activating one-shot 56 and deenergizing relay 64. (It will be appreciated that the zero detect output ZD of counter 42 has a duration of only one period of oscillator 40. However, one-shot 56 continues to deenergize relay 64 for the entire one-shot time duration.) The time interval between input pulses necessary to allow counter 42 to decrement to zero directly corresponds to the frequency of oscillator 40, which had previously been calibrated to the desired threshold set by switch arrays 48,50 during the calibration mode of operation. That is, in the specific example herein discussed where nominal angular velocity of shaft 12 (FIG. 1) is 400 rpm, and the desired detection threshold is 75% of nominal speed or 300 rpm, the frequency of oscillator 40 set during the calibration mode of operation is precisely high enough to decrement counter 42 to zero when the time intervals between successive input pulses correspond to a rotational velocity of 300 rpm. In this example, the time interval between successive input pulses at 300 rpm is 200 milliseconds, the period of oscillator 40 is approximately two milliseconds (actually 200/99 or 2.02 milliseconds), and the frequency of oscillator 40 is therefore approximately 500 Hz (actually 495 Hz).

The system of FIG. 2 may also be employed for high or overspeed detection. In this mode of operation, the unit is calibrated by placing switch 52 in the RUN position, so that counter 42 is preset to a count of "99" upon occurrence of each shaft rotation pulse. With the shaft running at nominal speed, resistor 30 is adjusted until LED is marginally out of alarm (i.e., turned on). Switches 48,50 are set at a value equal to 100-P, where "P" is the desired overspeed percentage threshold. For example, if 30% overspeed detection is desired, switches 48,50 are set at "70" (100-30). For normal operation, switch 52 is placed in the CAL position. Thereafter, relay 64 and LED 72 will indicate an "underspeed alarm" condition until the speed is more than 30% above nominal, whereupon LED 72 and relay 64 switch out of "alarm" to indicate an overspeed condition —i.e., relay 64 and LED 72 are off.

Figure 3:
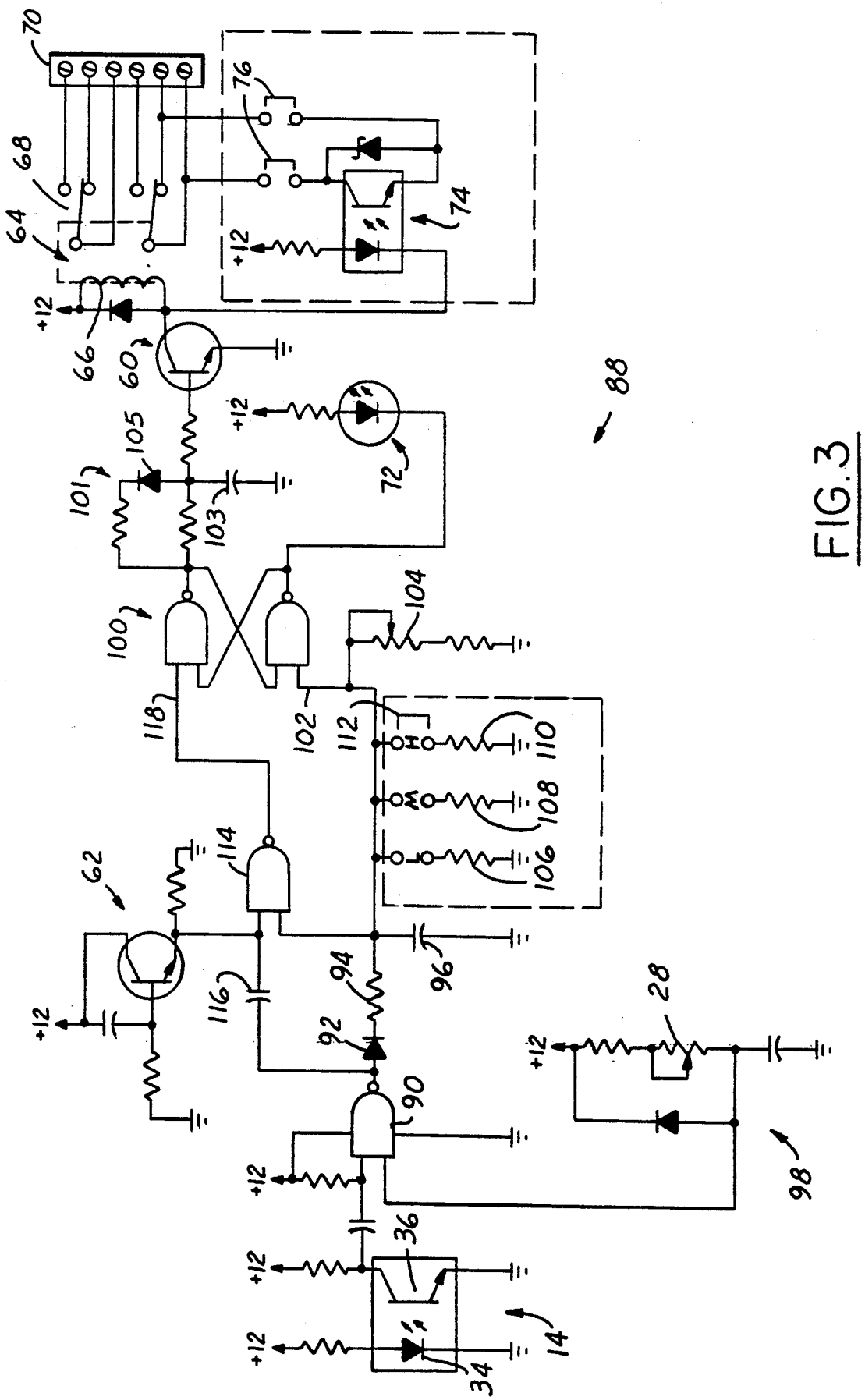
FIG. 3 is an electrical schematic diagram of a second embodiment of the present invention.

FIG. 3 illustrates a second embodiment 88 of the invention, in which reference numerals identical to those employed in FIGS. 1 and 2 indicate correspondingly identical elements. Input pulses from coupler 14 are fed to one input of a gate 90, in which the pulses are inverted and then applied through a diode 92 and a resistor 94 to an energy storage capacitor 96. A power-on delay circuit 98, which includes variable resistor 28, is connected to the second input of gate 90. A latch 100 has a first input 102 connected across capacitor 96. A variable resistor 104 and/or a plurality of fixed resistors 106-110 with associated jumpers 112, are also connected across capacitor 96 to drain energy stored thereon at a rate corresponding to the resistance value of the variable or selected fixed resistor. Capacitor 96 is also connected to one input of a gate 114, which receives a second input from gate 90 through a capacitor 116. The output of gate 114 is connected to a second input 118 of latch 100. The normally high (in the non-alarm mode) output of latch 100 is connected through a delay 101 to relay-drive transistor 60, and thence to relay 64 and terminal block 70 as previously described. Transistor 60 is also connected to coupler 74 and jumpers 76 as previously described. LED 72 is connected to the normally low (in the non-alarm mode) output of latch 100.

In operation of the embodiment of FIG. 3, the negative-going leading edges of incoming pulses from coupler 14 are inverted by gate 90 and rapidly charge capacitor 96. Thereafter, between the input pulses, charge is drained from capacitor 96 at a rate of decay determined by variable resistor 104 and/or fixed resistors 106-110 selected by jumpers 112. When the voltage on capacitor 96 decreases below the threshold of latch input 102, indicating low-speed rotation of shaft 12 (FIG. 1) and low frequency of input pulses, latch 100 is set to an alarm condition, rapidly discharging capacitor 103 in delay 101 through diode 105, and turning off transistor 60. Relay 64 is thereby deenergized, as is LED 72, to indicate a low-speed alarm condition. Thereafter, when the speed of shaft rotation increases sufficiently to bring the voltage across capacitor 96 above the threshold of latch input 102, the voltage on capacitor 96 also enables operation of gate 114, and the next input pulse functions through capacitor 116 to reset latch 100 to the non-alarm condition. LED 72 is illuminated immediately. When delay 101 times out, transistor 60 is turned on and relay 64 is reenergized to indicate removal of the alarm condition. Upon initial application of electrical power to the detection circuitry, delay 62 functions through gate 114 to insure that latch 100 is initially set in the non-alarm condition. At the same time, power-on delay 98 disenables gate 90, so that voltage is placed on capacitor 96 and latch 100 remains in the non-alarm state independently of input pulses from coupler 114. When delay 98 times out, latch 90 follows input pulses from coupler 14 as previously described.

It will thus be appreciated that the embodiment of FIG. 3 is constructed to respond to a specific preselected low-speed detection threshold value, rather than a detection threshold that corresponds to a percentage of a nominal shaft velocity. That is, resistors 104-110 are selected and/or adjusted to obtain a specific low-speed detection threshold. For example, resistors 106,108,110 may be selected alternatively by jumper 112 to obtain a low-speed alarm threshold of 0.5, 5 or 50 rpm respectively. Alternatively, jumper 112 may be deleted entirely, and the low-speed detection threshold may be set at any desired level by manipulation of resistor 104.

As with the embodiment of FIG. 2, system 88 of FIG. 3 may be employed to indicate an overspeed condition. Resistor 104 is adjusted, or resistors 106,108,110 are selected, so that capacitor 96 will just discharge, and LED 72 and relay 64 will just turn off, when the shaft is rotating at just less than the desired overspeed threshold. Thus, as in the case of FIG. 2, the "alarm" LED and relay are normally turned off, and are turned on only when shaft rotation exceeds the desired high-speed threshold

We claim:

1. Apparatus for monitoring rotation velocity of a shaft comprising:
   means for coupling to the shaft to provide a series of electrical pulses at a frequency corresponding to rotational velocity of the shaft,
   a digital counter,
   means responsive to each of said pulses for setting said counter to a first preselected count,
   means for clocking said counter between said pulses toward a second preselected count,
   means coupled to said counter for indicating a preselected speed condition when said counter reaches said second preselected count,
   said clocking means comprising an oscillator having a clock frequency coordinated with said first and second counts so as to activate said indicating to a predetermined percentage of nominal rotational velocity of said shaft,
   said counter comprising a programmable decade down-counter having data inputs for determining said first count to which said counter is set upon occurrence of each of said pulses,
   decade switch means coupled to said data inputs of said decade counter and responsive to an operator for directly setting said percentage of said nominal rotational velocity, and
   means for setting separate calibration and run modes of operation, means responsive to said mode-setting means in one of said calibration and run modes of operation for connecting said switch means to said data inputs so as to set said counter to a count corresponding to settings of said switch means, means coupled to said mode-setting means in the other of said calibration and run modes of operation for setting said counter to a count of substantially one hundred, and means for adjusting clock frequency of said oscillator with said shaft rotating at said nominal velocity until said indicating means indicates said preselected speed condition.

2. The apparatus set forth in claim 1 further comprising means coupled to said indicating means for delaying operation of said indicating means for a preselected time duration upon initial application of electrical power to said apparatus.

3. The apparatus set forth in claim 2 further comprising means coupled to said operation-delaying means for selectively adjusting said time duration.

4. Apparatus for monitoring rotation velocity of a shaft comprising:
   means for coupling to the shaft to provide a series of electrical pulses at a frequency corresponding to rotational velocity of the shaft,
   a digital counter,
   means responsive to each of said pulses for setting said counter to a first preselected count,
   means for clocking said counter between said pulses toward a second preselected count,
   means coupled to said counter for indicating a preselected speed condition when said counter reaches said second preselected count,
   said clocking means comprising an oscillator having a clock frequency coordinated with said first and second counts so as to activate said indicating means when rotational velocity of said shaft decreases or increases to a predetermined percentage of nominal rotational velocity of said shaft,
   said counter comprising a programmable counter having data inputs for determining said first count to which said counter is set upon occurrence of each of said pulses,
   switch means coupled to said data inputs and responsive to an operator for determining said first count,
   means for setting separate calibration and run modes of operation,
   means responsive to said mode-setting means in said calibration mode of operation for connecting said switch means to said data inputs so as to set said counter to a said first count corresponding to settings of said switch means, and
   means for adjusting clock frequency of said oscillator in said calibration mode of operation with said pulses being at a frequency corresponding to said nominal velocity of said shaft such that said indicating means indicates said low speed condition.

5. The apparatus set forth in claim 4 wherein said counter comprises a decade counter, and wherein said switch means comprises decade switch means coupled to said data inputs of said decade counter for directly setting said percentage of said nominal rotational velocity.

6. The apparatus set forth in claim 5 wherein said counter comprises a down-counter, and wherein said apparatus further comprises means coupled to said mode-setting means in said run mode of operation for setting said counter to a count of substantially one hundred.

7. The apparatus set forth in claim 4 further comprising means coupled to said mode-setting means for setting said counter upon occurrence of each of said pulses in said run mode of operation to a count corresponding to said nominal rotational velocity.

8. Apparatus for monitoring rotational velocity of a shaft comprising:
   means for coupling to the shaft to provide a series of electrical pulses at a frequency corresponding to rotational velocity of the shaft,
   a capacitor,
   means for storing electrical energy on said capacitor in response to each of said pulses,
   means coupled to said capacitor and responsive to voltage on said capacitor to indicate a preselected speed condition when said voltage on said capacitor is below a predetermined threshold, and
   means for draining electrical energy from said capacitor at a preselected rate coordinated with frequency of said pulses so that voltage on said capacitor reaches said threshold at a preselected speed of rotation of said shaft.

9. The apparatus set forth in claim 8 wherein said energy-draining means comprises means for selectively varying rate of decay of voltage on said capacitor.

10. The apparatus set forth in claim 9 wherein said energy-draining means comprises variable resistance means connected across said capacitor.

11. The apparatus set forth in claim 10 wherein said variable resistance means comprises a plurality of resistors and means for selectively connection said resistors across said capacitor.

12. The apparatus set forth in claim 8 wherein said voltage-responsive means comprises a latch having one input coupled to said capacitor for setting said latch to a first state when voltage on said capacitor is less than said threshold, and a second input coupled to said capacitor and said pulse-providing means to set said latch to a second state upon occurrence of a said pulse when said voltage is above said threshold.

13. The apparatus set forth in claim 12 further comprising means for setting said latch to said second state independently of said pulses for a preselected time duration upon initial application of electrical power to said apparatus.

14. The apparatus set forth in claim 13 further comprising means for selectively varying said time duration.

* * * * *